(12) United States Patent
Todoroki et al.

(10) Patent No.: US 7,561,443 B2
(45) Date of Patent: Jul. 14, 2009

(54) ELECTRONIC APPARATUS AND ELECTRONIC APPARATUS MANUFACTURING METHOD

(75) Inventors: Hirokazu Todoroki, Kunitachi (JP); Yuuhei Kurono, Hachioji (JP); Hirokazu Seraku, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/809,279

(22) Filed: May 31, 2007

(65) Prior Publication Data

US 2008/0137310 A1 Jun. 12, 2008

(30) Foreign Application Priority Data

Dec. 7, 2006 (JP) ............................ P2006-330841

(51) Int. Cl.
*H04B 1/03* (2006.01)
(52) U.S. Cl. ................. 361/814; 361/681; 361/683; 455/557; 455/575.1; 455/575.4
(58) Field of Classification Search .............. 361/814, 361/681, 683; 455/557, 575.1, 575.4
See application file for complete search history.

(56) References Cited

U.S. PATENT DOCUMENTS

| | | | | |
|---|---|---|---|---|
| 5,960,332 | A * | 9/1999 | Michalzik | 455/575.1 |
| 6,334,786 | B1 * | 1/2002 | Lee | 439/331 |
| 6,665,544 | B1 * | 12/2003 | Michel et al. | 455/558 |
| 7,039,439 | B2 * | 5/2006 | Lee | 455/558 |
| 7,043,282 | B2 * | 5/2006 | Inomata et al. | 455/575.1 |
| 7,081,020 | B1 * | 7/2006 | Lee | 439/630 |
| 7,319,893 | B2 * | 1/2008 | Kato et al. | 455/575.4 |
| 2004/0048638 | A1 * | 3/2004 | Inomata et al. | 455/572 |
| 2005/0054398 | A1 * | 3/2005 | Kim | 455/575.4 |
| 2005/0113154 | A1 * | 5/2005 | Park et al. | 455/575.4 |
| 2005/0119034 | A1 * | 6/2005 | Kato et al. | 455/575.4 |
| 2005/0288077 | A1 * | 12/2005 | Wu | 455/575.4 |
| 2006/0046796 | A1 * | 3/2006 | Park et al. | 455/575.4 |
| 2006/0160423 | A1 * | 7/2006 | Lee | 439/630 |
| 2006/0176654 | A1 * | 8/2006 | Kfoury | 361/681 |
| 2006/0180457 | A1 * | 8/2006 | Han et al. | 200/550 |
| 2007/0004395 | A1 * | 1/2007 | Duan et al. | 455/422.1 |
| 2007/0058330 | A1 * | 3/2007 | Lin | 361/681 |
| 2007/0128904 | A1 * | 6/2007 | Kang et al. | 439/159 |
| 2007/0135163 | A1 * | 6/2007 | Lee | 455/557 |

(Continued)

FOREIGN PATENT DOCUMENTS

JP 2006-165854 A 6/2006

*Primary Examiner*—Dean A. Reichard
*Assistant Examiner*—Xiaoliang Chen
(74) *Attorney, Agent, or Firm*—Frishauf, Holtz, Goodman & Chick, P.C.

(57) ABSTRACT

According to one embodiment, an electronic apparatus comprising: a first casing including a retaining hook; a second casing including a stopper edge; and a sliding unit including a base frame and a slider, the base frame coupled to the second casing, the slider separably coupled to the first casing; wherein the slider is slidable on the base frame so that the second casing is movable between an open position and a close position, the close position for covering the first casing with the second casing, the open position for exposing the first casing; wherein the retaining hook engages with the stopper edge if the second casing is at the close position; and wherein the slider has an engaging part that is engageable with the retaining hook if the first casing is separated from the second casing.

17 Claims, 11 Drawing Sheets

U.S. PATENT DOCUMENTS

2007/0155447 A1* 7/2007 Gordecki ................. 455/575.4
2007/0243912 A1* 10/2007 Lee et al. ................. 455/575.4
2007/0293283 A1* 12/2007 Inubushi et al. .......... 455/575.1
2008/0058039 A1* 3/2008 Lee et al. ................. 455/575.4

* cited by examiner

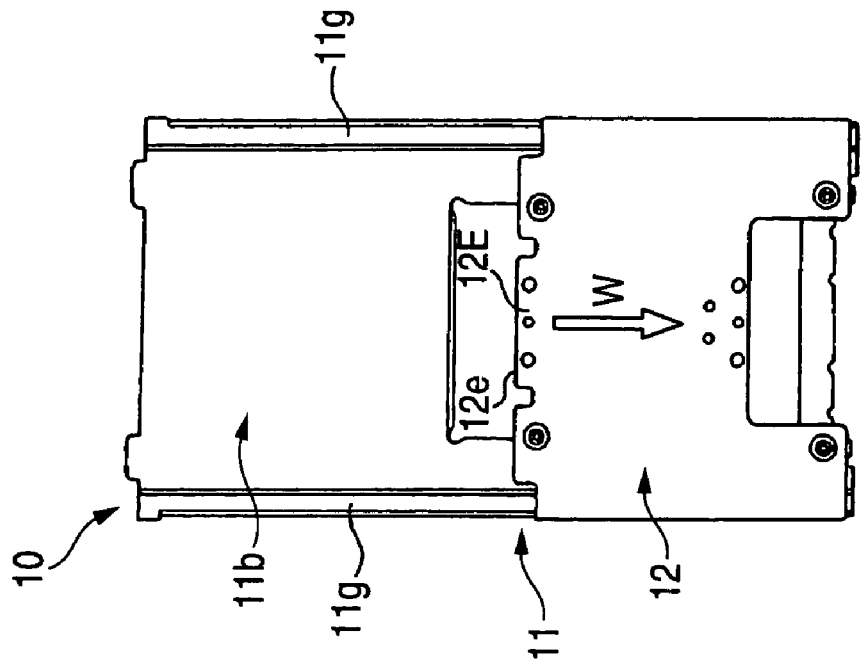
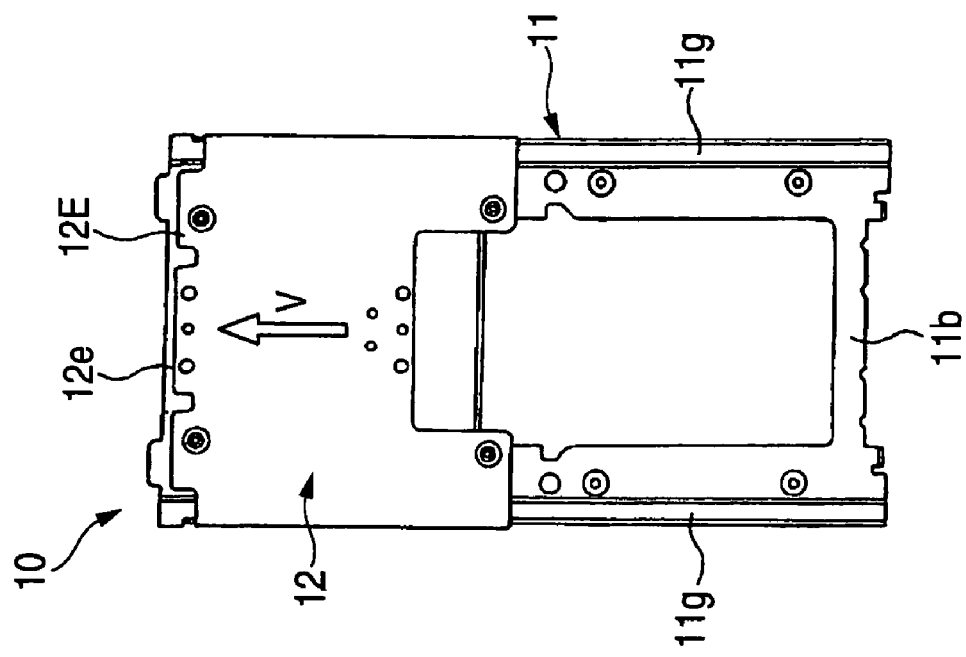

FIG. 13A
FIG. 13B
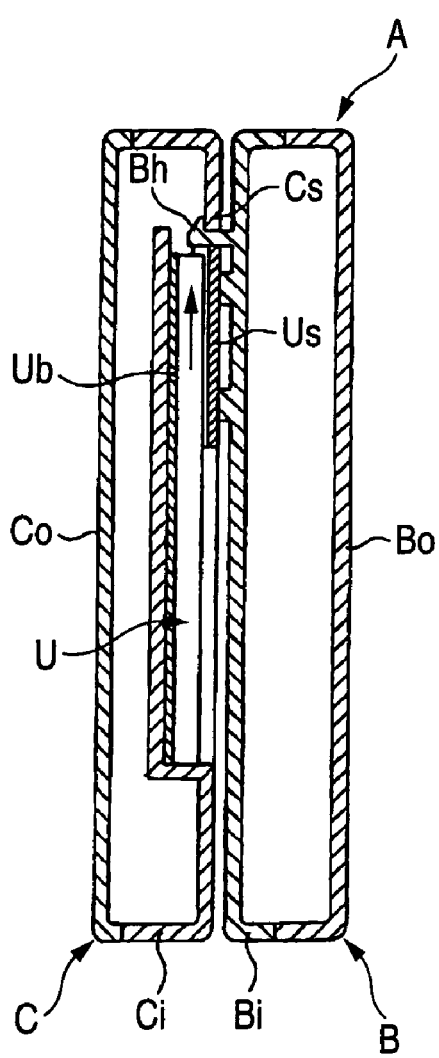
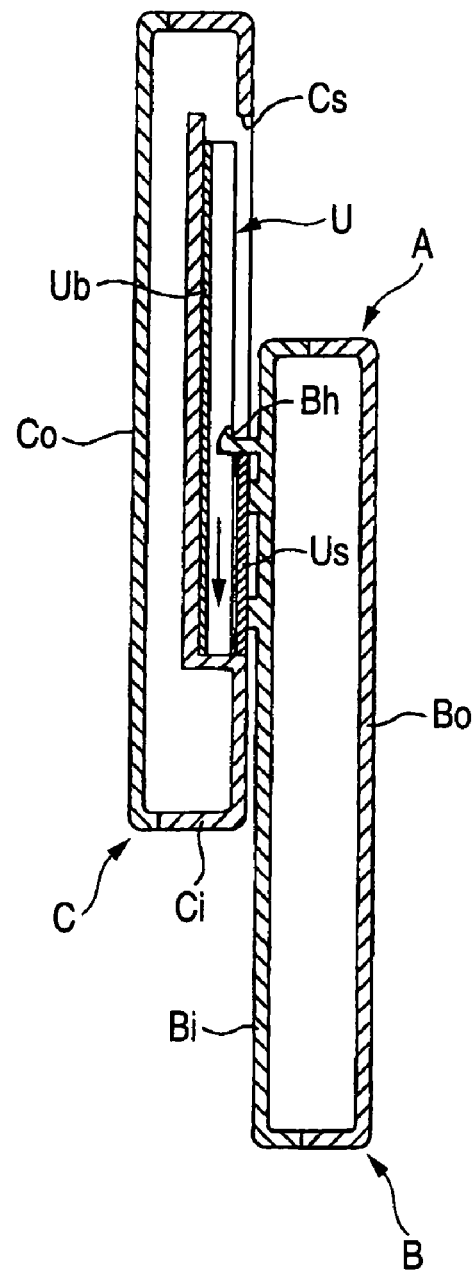

ELECTRONIC APPARATUS AND ELECTRONIC APPARATUS MANUFACTURING METHOD

CROSS-REFERENCE TO RELATED APPLICATIONS

This application is based upon and claims the benefit of priority from Japanese Patent Application No. 2006-330841, filed Dec. 7, 2006, the entire contents of which are incorporated herein by reference.

BACKGROUND

1. Field

One embodiment of the invention relates to an electronic apparatus comprising a body casing and a lid casing assembled via a spring-assisted sliding unit to allow the lid casing to slide between a closed position where the body casing is covered and an open position where the body casing is exposed, and its manufacturing method.

2. Description of the Related Art

For example, among cell phones as an example of electronic apparatus, there are provided a so-called slide-open cell phone where a body casing and a lid casing are coupled via a sliding mechanism in order to provide ease of handling in use and a compact design as a carry-along tool (for example, refer to JP-A-2006-165854).

As shown in FIGS. 11 to 13, a related art slide-open cell phone A comprises a body casing B including operation keys Bk, Bk . . . and a transmitter Bm, and a lid casing C including a liquid crystal display Cd and a receiver Cr. The body casing B and the lid casing C are coupled to each other via a spring-assisted sliding unit U. The lid casing C moves in a sliding fashion between a closed position where the lid casing C is overlaid on the body casing B to cover its entirety as shown in FIG. 11($a$) and an open position where the operation keys Bk, Bk . . . of the body casing B are exposed as shown in FIG. 11($b$).

The spring-assisted sliding unit U interposed between the body casing B and the lid casing C includes a unit body Ua having a base frame Ub on which a pair of guide rails Ul, Ul is formed side by side and an energizing spring (not shown) and a slider Us movable between a closed end position (FIG. 12) and an open end position (FIG. 13) along the guide rails Ul, Ul of the unit body Ua.

The slider Us is energized toward the closed end position and the open end position from the center region of the travel range by way of the energizing spring (not shown) of the unit body Ua and is also energized by a spring (not shown) to remain in the closed end position and the open end position.

The body casing B of the cell phone A is composed of an inner case Bi and an outer case Bo assembled to each other. The lid casing C is composed of an inner case Ci and an outer case Co assembled to each other. The spring-assisted sliding unit U includes a unit body Ua (base frame Ub) mounted on the inner case Ci of the lid casing C and a slider Us mounted on the inner case Bi of the body casing B.

The inner case Bi of the body casing B has a retaining hook Bh protruding therefrom. The inner case Ci of the lid casing C has a stopper edge Cs formed thereon. As shown in FIGS. 11($a$) and 13($a$), while the lid casing C occupies the closed position with respect to the body casing B, the retaining hook Bh of the body casing B is engaged with the stopper edge Cs of the lid casing C thereby preventing isolation of the body casing B from the lid casing C.

In the manufacture of the slide-open cell phone A, in a process for assembling the body casing B and the lid casing C to each other, the unit body Ua (base frame Ub) of the spring-assisted sliding unit U is screwed into the inner case Ci of the lid casing C and then the inner case Bi of the body casing B is screwed into the slider Us of the spring-assisted sliding unit U.

When the inner case Bi of the body casing B is assembled to the slider Us, in a state where the slider Us occupies the closed end position, the stopper edge Cs of the inner case Ci of the lid casing C is in close proximity to the edge of the slider Us. It is difficult to insert a retaining hook Bh between the stopper edge Cs and the slider Us to place the inner case Bi of the body casing B on the slider Us.

Thus, the slider Us of the spring-assisted sliding unit U is caused to occupy the open end position and the inner case Bi of the body casing B is screwed into the slider Us. In the process, it is necessary to screw the retained inner case Bi into the slider Us while positioning the inner case Bi with respect to the slider Us. This makes the assembly work quite cumbersome. Further, it is difficult to accurately position the inner case Bi with respect to the slider Us.

SUMMARY

According to one embodiment of the invention, an electronic apparatus comprising: a first casing including a retaining hook; a second casing including a stopper edge; and a sliding unit including a base frame and a slider, the base frame coupled to the second casing, the slider separably coupled to the first casing; wherein the slider is slidable on the base frame so that the second casing is movable between an open position and a close position, the close position for covering the first casing with the second casing, the open position for exposing the first casing; wherein the retaining hook engages with the stopper edge if the second casing is at the close position; and wherein the slider has an engaging part that is engageable with the retaining hook if the first casing is separated from the second casing.

According to another embodiment of the invention, a method of manufacturing an electronic apparatus, wherein the electronic apparatus includes: a first casing including a retaining hook, a second casing including a stopper edge, and a sliding unit including a base frame and a slider, the base frame coupled to the second casing, the slider separably coupled to the first casing; the slider is slidable on the base frame so that the second casing is movable between an open position and a close position, the close position for covering the first casing with the second casing, the open position for exposing the first casing; the retaining hook engages with the stopper edge if the second casing is at the close position; and the slider has an engaging part that is engageable with the retaining hook if the first casing is separated from the second casing; the method comprising: engaging the retaining hook with the engaging part if the first casing and the second casing are separated from each other; moving the second casing in an opening direction to relatively move the slider to the opening direction with respect to the second casing; inserting the retaining hook into the second casing to bring the first casing into contact with the slider; moving the second casing in a closing direction to engage the retaining hook with the stopper edge to position the first casing and the second casing with each other by pressing the retaining hook onto the stopper edge with the slider in the closing direction, and fixing the first casing to the slider.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3(a) is an exemplary plan view showing a state where the slider of the spring-assisted sliding unit of the cell phone shown in FIG. 1 occupies a closed end position.

FIG. 3(b) is an exemplary plan view showing a state where the slider of the spring-assisted sliding unit of the cell phone shown in FIG. 1 occupies an open end position.

FIG. 13(a) is an exemplary sectional view of the closed state of a related art slide-open cell phone.

FIG. 13(b) is an exemplary sectional view of the open state of a related art slide-open cell phone.

DETAILED DESCRIPTION

The invention will be detailed referring to figures that show an embodiment of the invention.

FIGS. 1 through 11 show an embodiment where the invention is applied to a cell phone as an aspect of electronic apparatus. The slide-open cell phone 1 comprises a body casing 2 and a lid casing, the body casing 2 including operation keys 2K and a transmitter 2M, the lid casing including a liquid crystal display 3D and a receiver 3R. The body casing 2 and the lid casing 3 are coupled to each other via a spring-assisted sliding unit 10. The lid casing 3 moves in a sliding fashion between a closed position where the lid casing 3 is overlaid on the body casing 2 to cover its entirety as shown in FIG. 1(a) and an open position where the operation keys 2K, 2K of the body casing 2 are exposed as shown in FIG. 1(b).

Figure 2:
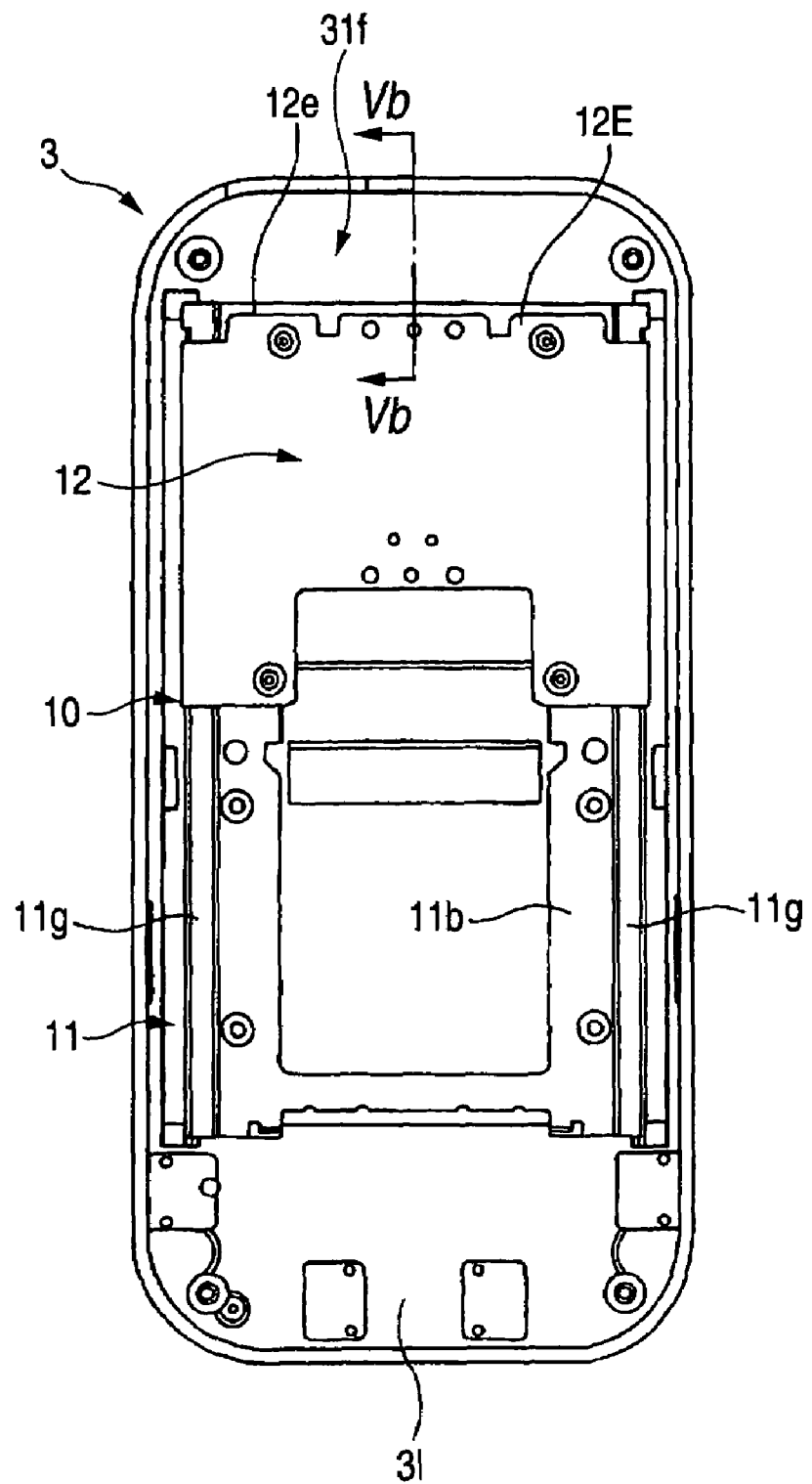
FIG. 2 is an exemplary top plan view showing the upper case of the body casing of the cell phone of FIG. 1 together with a spring-assisted sliding unit.
Figure 4:
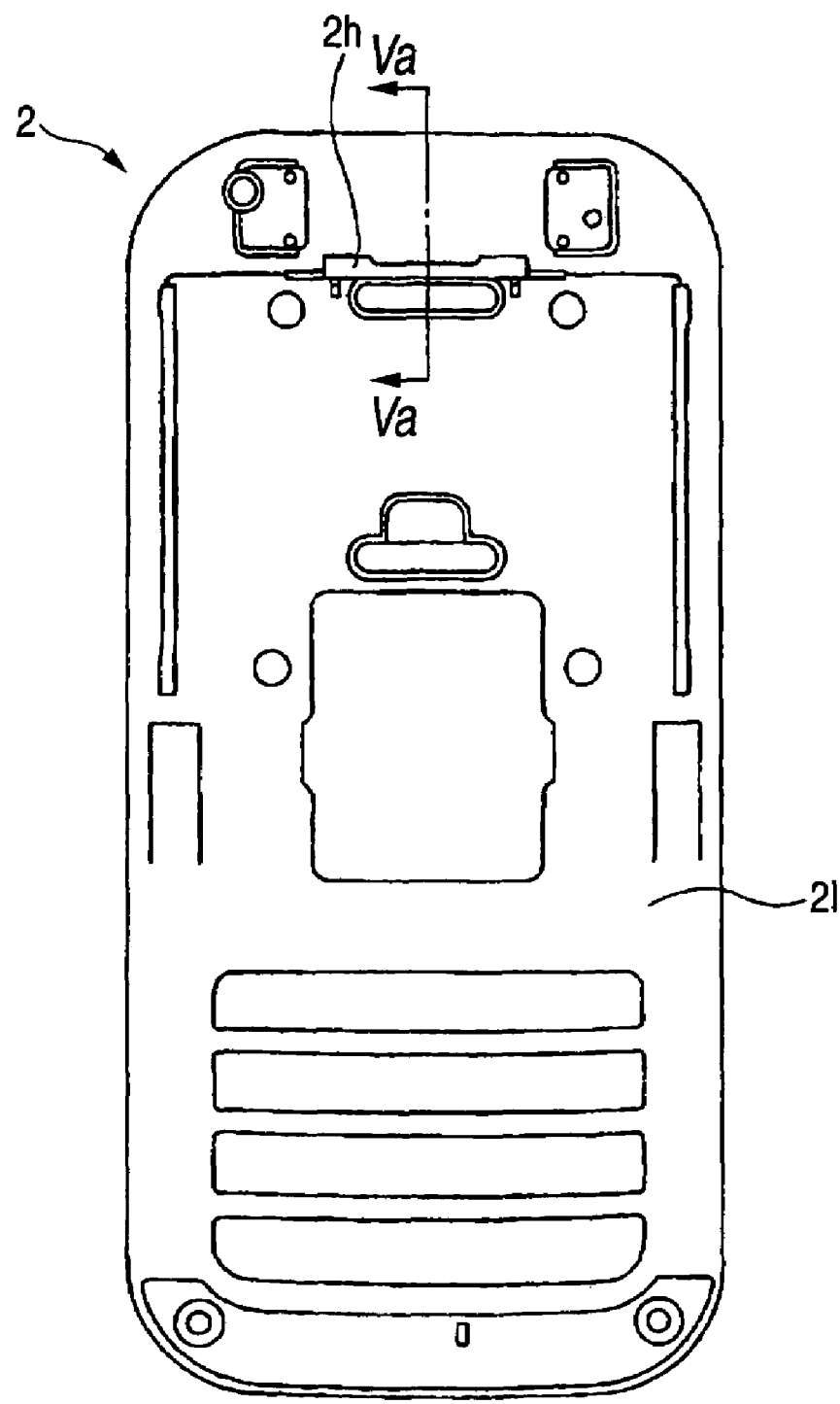
FIG. 4 is an exemplary bottom plan view showing the lower case of the lid casing of the cell phone of FIG. 1.

The spring-assisted sliding unit 10 interposed between the body casing 2 and the lid casing 3 includes a unit body 11 having a base frame 11b on which a pair of guide rails 11g, 11g is formed side by side and an energizing spring (not shown) and a slider 12 movable between a closed end position shown in FIGS. 2 and 3(a) and an open end position shown in FIG. 3(b) along the guide rails 11g, 11g of the unit body 11.

As shown in FIG. 3, the slider 12 is energized in a closing direction (arrow mark V) toward the closed end position and in an opening direction (arrow mark W) toward the open end position from the center region of the travel range by way of the energizing spring (not shown) of the unit body 11 and is energized in the closing direction (arrow mark V) in the closed end position also to remain in the closed position as well as energized in the opening direction (arrow mark W) in the open end position also to remain in the open position.

The body casing 2 of the cell phone 1 is composed of an inner case 2I and an outer case 2O assembled to each other. The lid casing 3 is composed of an inner case 3I and an outer case 3O assembled to each other. The spring-assisted sliding unit 10 includes a unit body 11 (base frame 11b) screwed into the inner case 3I of the lid casing 3 and a slider 12 screwed into the inner case 2I of the body casing 2.

Figure 1B:
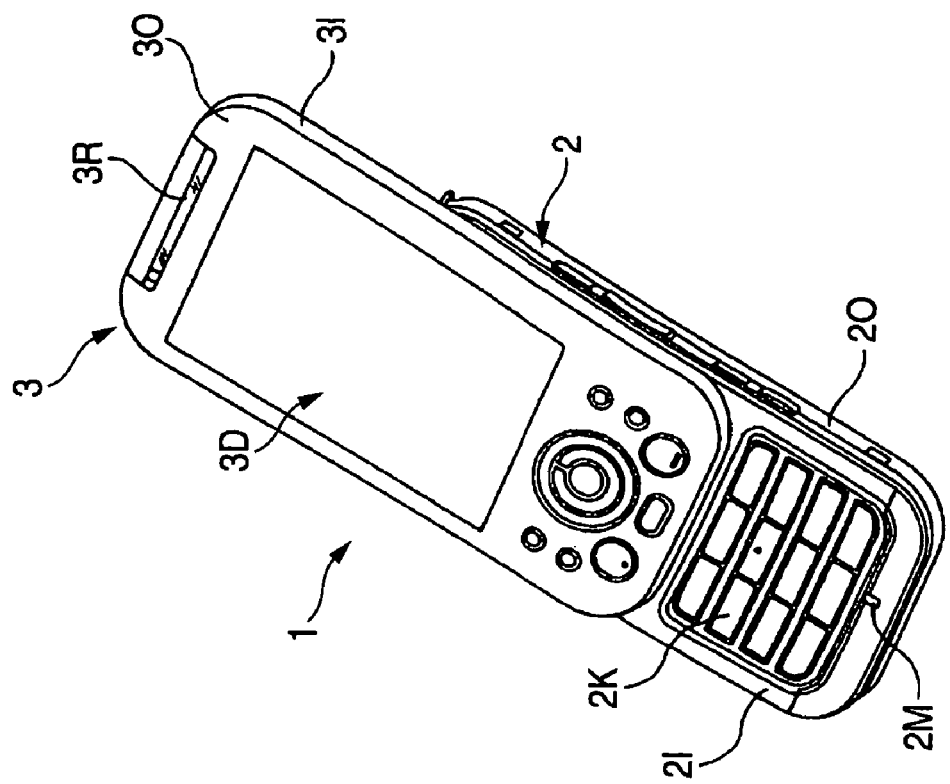
FIG. 1(b) is an exemplary external perspective view showing the open state of the slide-open cell phone as an embodiment of an electronic apparatus according to the invention.
Figure 1A:
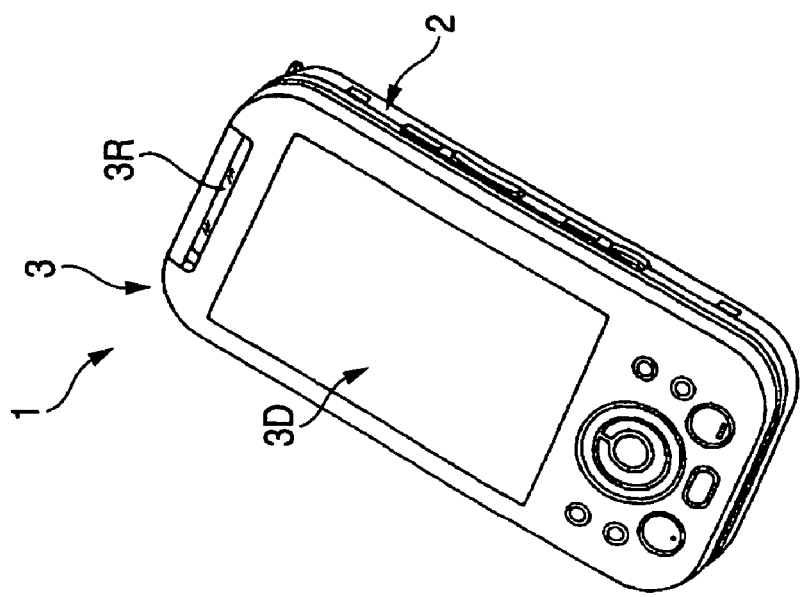
FIG. 1(a) is an exemplary external perspective view showing the closed state of a slide-open cell phone as an embodiment of an electronic apparatus according to the invention.
Figure 5A:
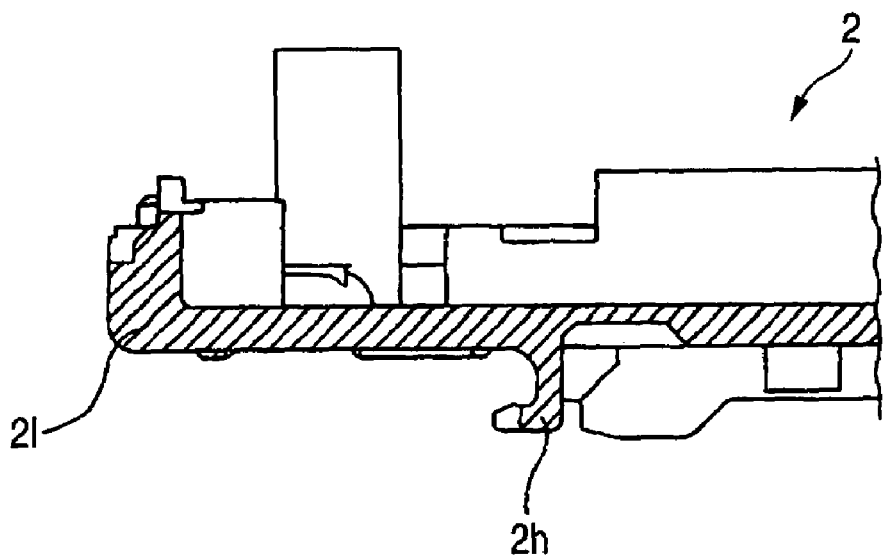
FIG. 5(a) is an exemplary sectional view taken along line Va-Va of FIG. 4.
Figure 5B:
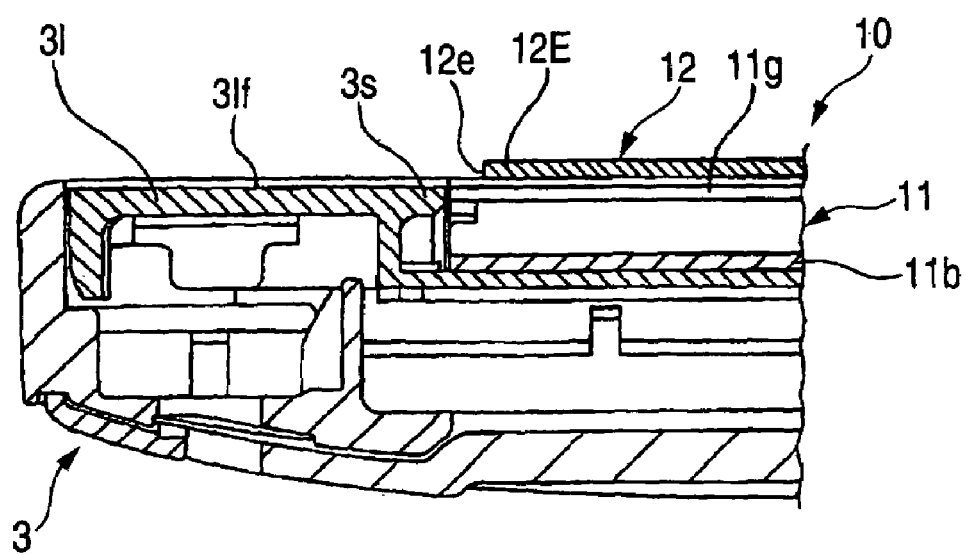
FIG. 5(b) is an exemplary sectional view taken along line Vb-Vb of FIG. 2.
Figure 6:
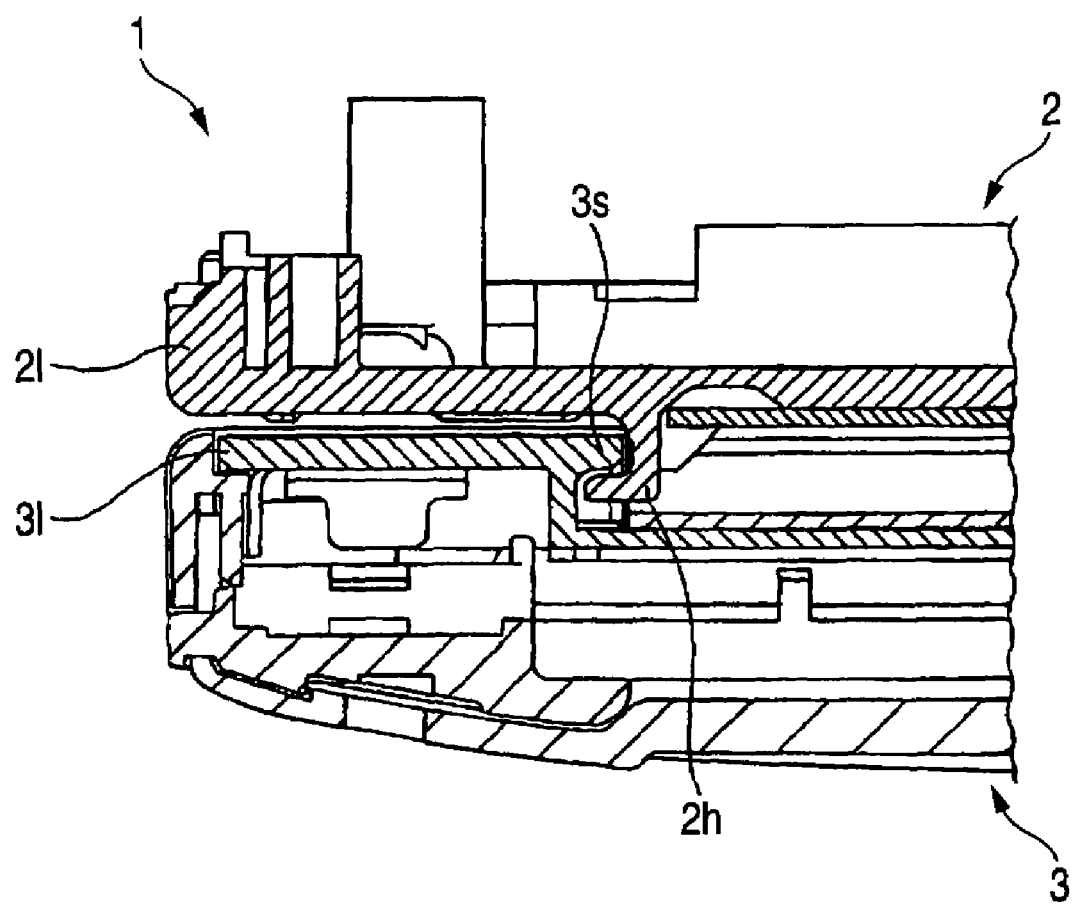
FIG. 6 is an exemplary side view of a cross section at relevant part showing the relation between the body casing and the lid casing in the closed state of the cell phone shown in FIG. 1.

As shown in FIG. 5(a), the inner case 2I of the body casing 2 has a retaining hook 2h protruding therefrom. As shown in FIG. 5(b), the inner case 3I of the lid casing 3 has a stopper edge 3s formed thereon. As shown in FIGS. 1(a) and 6, while the lid casing 3 occupies the closed position with respect to the body casing 2, the retaining hook 2h of the body casing 2 is engaged with the stopper edge 3s of the lid casing 3 thereby preventing isolation of the body casing 2 from the lid casing 3.

In the manufacture of the cell phone described later, the slider 12 of the spring-assisted sliding unit 10 has an engaging part 12E capable of being engaged with the retaining hook 2h of the body casing 2 formed on an edge 12e opposed to the stopper edge 3s of the inner case 3I of the lid casing 3. The engaging part 12E is provided by protruding the slider 12 outward through the external surface 3If of the inner case 3I of the lid casing 3.

Figure 7:
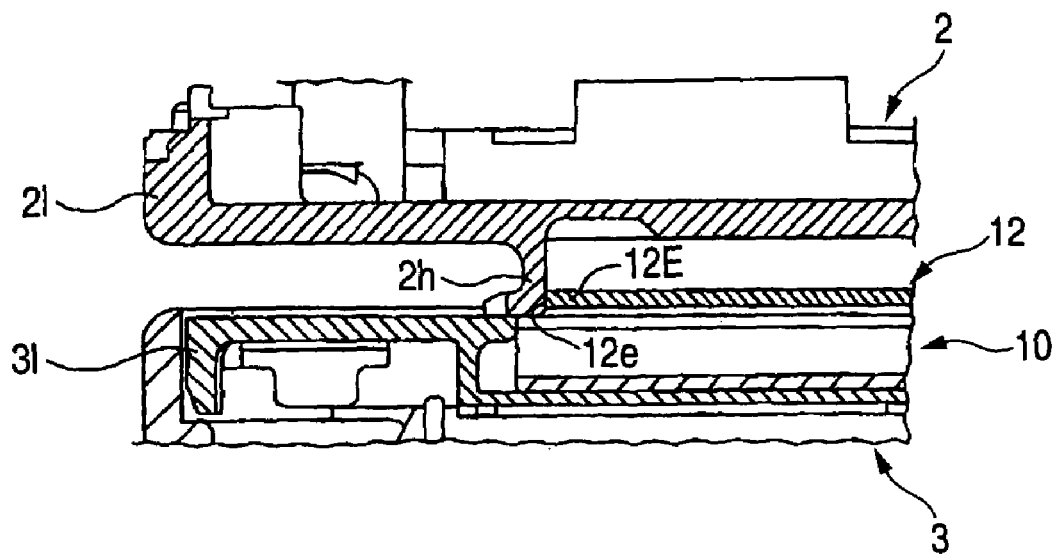
FIG. 7 is an exemplary sectional view at relevant part showing the assembly process of the cell phone of FIG. 1.

The following describes, step by step, the process of assembling the body casing 2 and the lid casing 3 to each other in the manufacture of the slide-open cell phone 1 described earlier. As shown in FIG. 7, the unit body 11 (base frame 11b) of the spring-assisted sliding unit 10 is screwed into the inner case 3I of the lid casing 3 to cause the slider 12 to occupy the closed end position.

Figure 8:
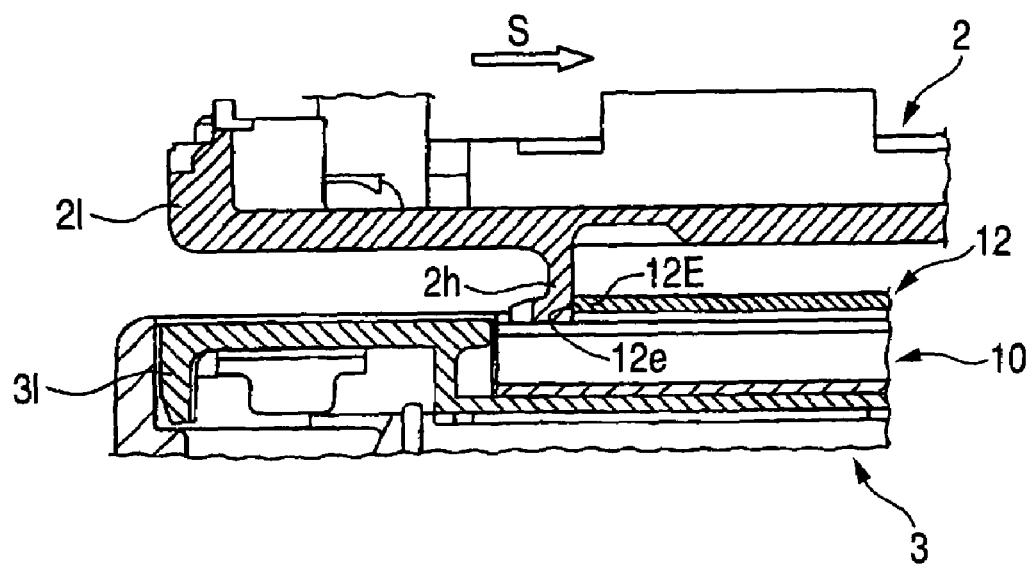
FIG. 8 is an exemplary sectional view at relevant part showing the assembly process of the cell phone of FIG. 1.

Next, the retaining hook 2h of the inner case 2I of the body casing 2 is abutted against (engaged with) the engaging part 12E (12e) of the slider 12 that occupies the closed end position. Then, as shown in FIG. 8, the inner case 2I is moved in an opening direction (in a direction the lid casing 3 is relatively opened with respect to the inner case 2I of the body casing 2) as shown by an arrow S to move the slider 12 in an opening direction with respect to the lid casing 3.

Figure 9:
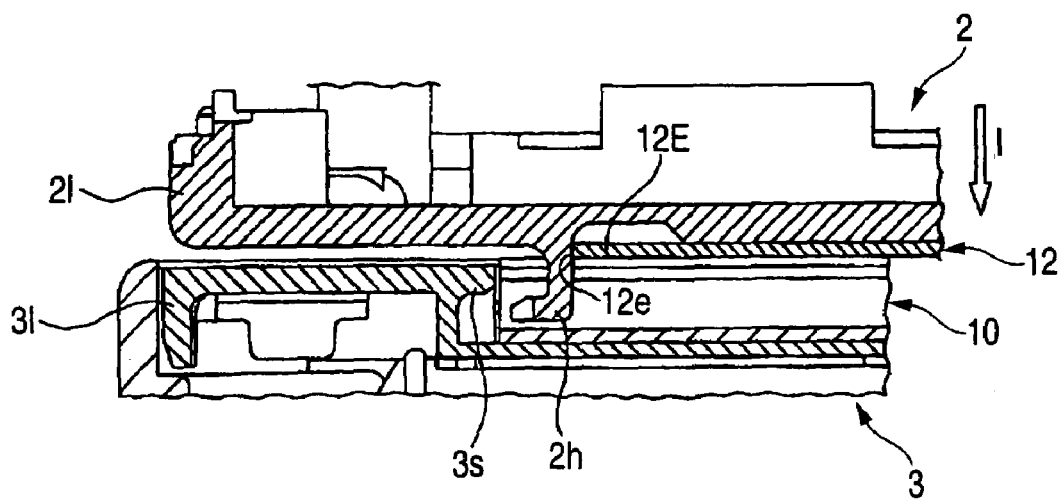
FIG. 9 is an exemplary sectional view at relevant part showing the assembly process of the cell phone of FIG. 1.

As shown in FIG. 9, the inner case 2I of the body casing 2 is brought near the lid casing 3 in the direction of the arrow I. The retaining hook 2h is inserted into the inner case 3I of the lid casing 3 and the inner case 2I of the body casing 2 is placed to abut against the slider 12.

Figure 10:
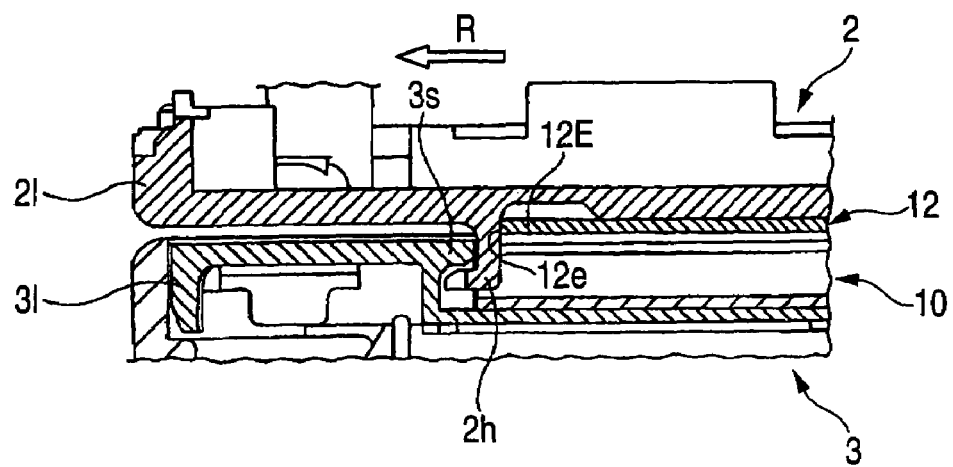
FIG. 10 is an exemplary sectional view at relevant part showing the assembly process of the cell phone of FIG. 1.
Figure 11B:
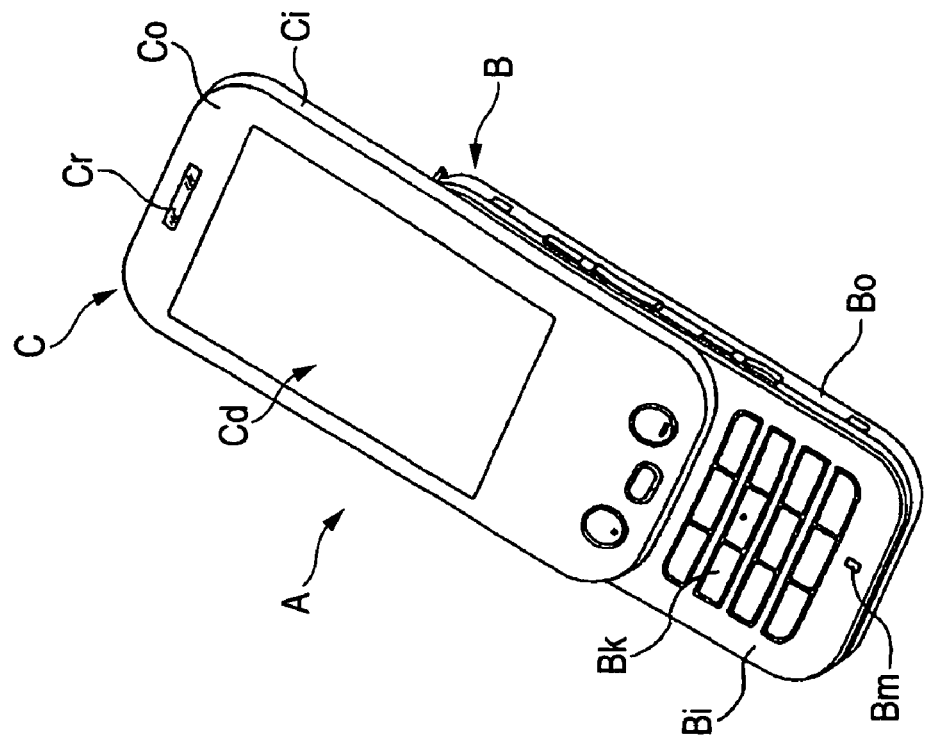
FIG. 11(b) is an exemplary external perspective view showing the open state of a related art slide-open cell phone.
Figure 11A:
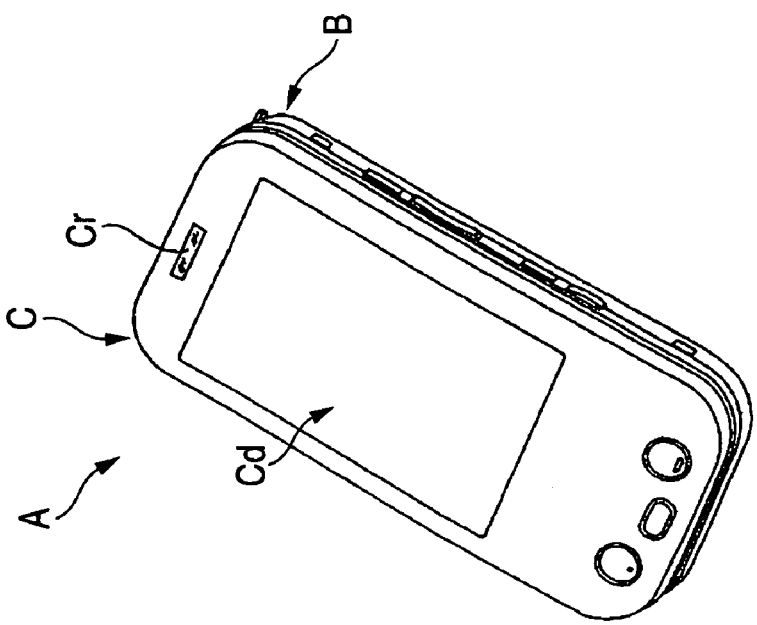
FIG. 11(a) is an exemplary external perspective view showing the closed state of a related art slide-open cell phone.
Figure 12:
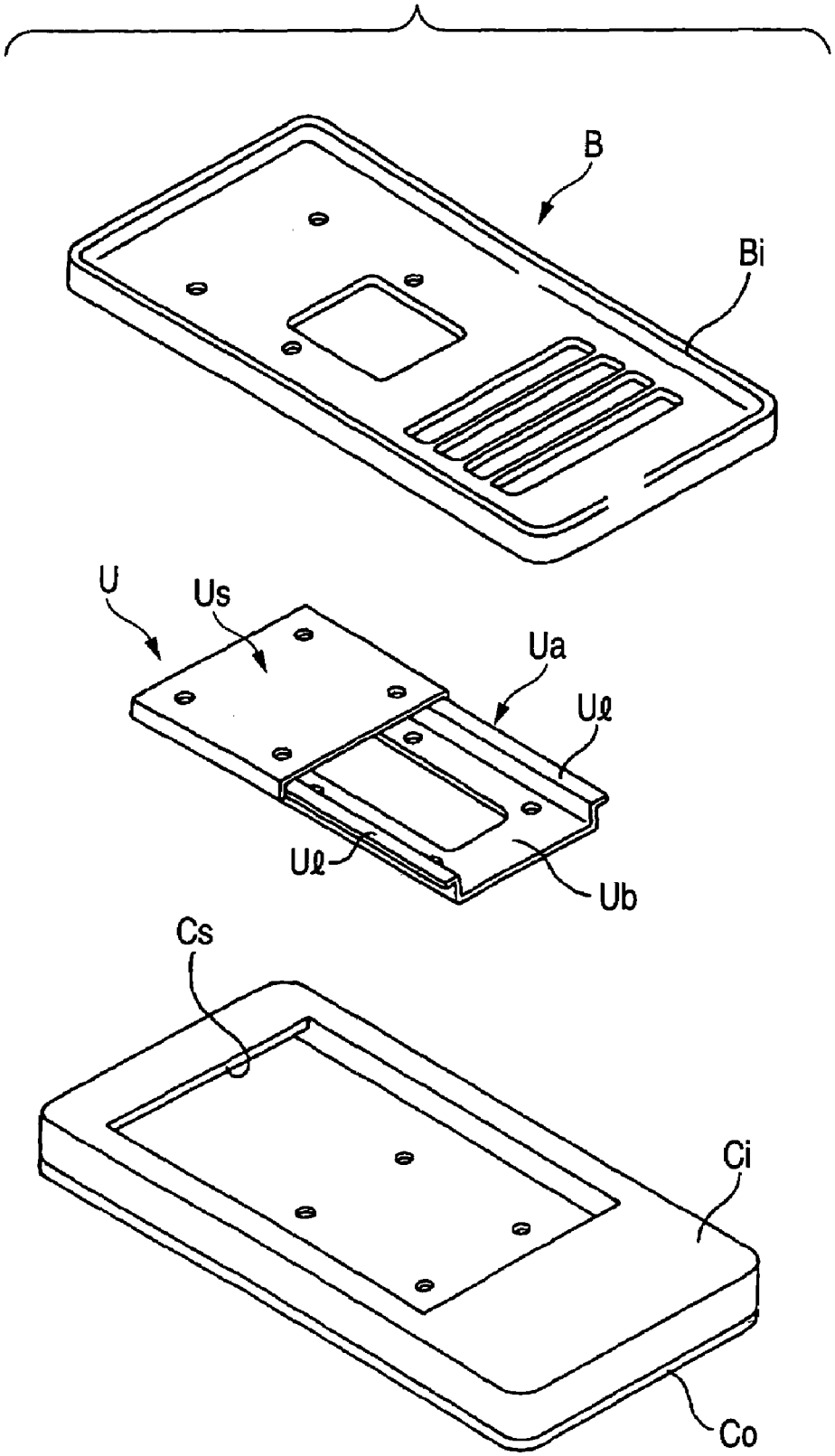
FIG. 12 is an exemplary external perspective view showing a state where the body casing is separated from the lid casing of a related art slide-open cell phone.

As shown in FIG. 10, the retaining hook 2h of the inner case 2I is pushed by slider 12 energized by the screw (not shown) of the spring-assisted sliding unit 10 in a closing direction (leftward in the figure) and moves in the direction of the arrow R (closing direction). This causes the retaining hook 2h of the inner case 2I to be engaged with the stopper edge 3s of the lid casing 3.

In this state, the retaining hook 2h is pressed by the stopper edge 3s by way of the slider 12 energized in the closing direction (leftward in the figure) and the retaining hook 2h is held between the stopper edge 3s and the slider 12 thus holding the inner case 2I with respect to the lid casing 3. Further, positioning of the inner case 2I with respect to the lid casing 3 (slider 12 of the spring-assisted sliding unit 10 mounted on the lid casing 3), or in other words, relative positioning of the lid casing 3 and the inner case 2I (body casing 2) is made.

In this way, in a state where the inner case 2I is positioned on the slider 12 of the spring-assisted sliding unit 10, the inner case 2I is screwed into the slider 12. This completes the process of assembling the inner case 2I and the lid casing 3 to each other, or in other words, assembling the body casing 2 and the lid casing 3 to each other.

In the configuration described above, an engaging part is provided 12E capable of being engaged with the retaining hook 2h of the body casing 2 at the edge 12e of the slider 12 opposed to the stopper edge 3s of the lid casing 3. Even in case the slider 12 of the spring-assisted sliding unit 10 mounted on the lid casing 3 is in the closed end position when the body casing 2 and the lid casing 3 are to be assembled to each other, it is possible to insert the retaining hook 2h between the engaging part and the stopper edge 3s of the lid casing 3 by engaging the retaining hook 2h with the engaging part 12E and moving the slider 12.

By holding the retaining hook 2h between the slider 12 energized in the closing direction and the stopper edge 3s, it is possible to hold the inner case 2I with respect to the lid casing 3 and position the inner case 2I with respect to the lid casing 3 (slider 12). This readily and accurately perform assembly work of the body casing 2 and the lid casing 3, thus attaining improved productivity related to the manufacture of a cell phone as well as its quality.

As described with reference to the embodiment, there is provided an electronic apparatus capable of readily and accurately assembling a device casing to a spring-assisted sliding unit thus attaining improved productivity and quality and a manufacturing method therefor.

While the foregoing embodiment applies the invention to a cell phone as an aspect of electronic apparatus, the invention is not limited to communications apparatuses such as a cell phone and a PHS (Personal Handyphone System) or portable information terminals such as an electronic dictionary and a PDA (Personal Data Assistance). Rather, the invention is quite advantageously applicable to a variety of electronic apparatuses where a body casing and a lid casing are assembled to each other via a spring-assisted sliding unit and the lid casing may slide between a closed position where the body casing is covered and an open position where the body casing is exposed, and its manufacturing method.

What is claimed is:

1. An electronic apparatus comprising:
a first casing including a retaining hook;
a second casing including a stopper edge; and
a sliding unit including a base frame and a slider, the base frame being coupled to the second casing, and the slider being adapted to be coupled to the first casing;
wherein the slider is slidable on the base frame so that the second casing is movable between a closed position in which the second casing covers the first casing and an open position in which the first casing is exposed;
wherein the retaining hook engages with the stopper edge when the second casing is moved to the closed position; and
wherein the slider comprises an engaging part which is positioned outward from the second casing, and which is adapted to engage with the retaining hook of the first casing when the first casing is not yet coupled to the slider and the second casing is separated from the first casing, such that the retaining hook is adapted to move the slider in an opening direction and then be inserted between the slider and the stopper edge of the second casing so as to enable the first casing to be coupled to the slider.

2. The electronic apparatus according to claim 1, wherein the slider is biased on the base frame so that the second casing is biased toward the closed position.

3. The electronic apparatus according to claim 1, wherein the slider is biased on the base frame so that the second casing is biased toward the open position.

4. The electronic apparatus according to claim 1, wherein the slider has an edge that faces the stopper edge; and
wherein the engaging part is formed on the edge of the slider.

5. The electronic apparatus according to claim 1,
wherein the slider has a contact surface that is in contact with the base frame when the slider is coupled to the base frame;
wherein the second casing has an opposing surface that is opposed to the first casing when the retaining hook engages with the stopper edge; and
wherein the contact surface is projected from the opposing surface toward the first casing.

6. The electronic apparatus according to claim 5, wherein the engaging part is formed as a step portion between the contact surface and the opposing surface.

7. The electronic apparatus according to claim 5, wherein the retaining hook has a bottom surface that is parallel with the opposing surface.

8. The electronic apparatus according to claim 4, wherein a gap is formed between the edge of the slider and the stopper edge when the second casing is at the closed position; and
wherein a size of the gap in a slidable direction of the slider is smaller than a size of the retaining hook in the slidable direction.

9. The electronic apparatus according to claim 1, wherein the electronic apparatus is a cellular phone.

10. The electronic apparatus according to claim 1, wherein the electronic apparatus is a portable information terminal.

11. A method of manufacturing an electronic apparatus, wherein the electronic apparatus includes a first casing including a retaining hook, a second casing including a stopper edge, and a sliding unit including a base frame and a slider, the base frame being coupled to the second casing, and the slider being adapted to be coupled to the first casing, wherein the slider is slidable on the base frame so that the second casing is movable between a closed position in which the second casing covers the first casing and an open position in which the first casing is exposed, wherein the retaining hook engages with the stopper edge when the second casing is moved to the closed position, and wherein the slider comprises an engaging part which is positioned outward from the second casing, the method comprising:

engaging the retaining hook with the engaging part when the first casing and the second casing are separated from each other;

moving the second casing relative to the first casing in an opening direction to move the slider in the opening direction with respect to the second casing;

inserting the retaining hook into the second casing to bring the first casing into contact with the slider;

moving the second casing in a closing direction to engage the retaining hook with the stopper edge to position the first casing and the second casing with respect to each other by pressing the retaining hook onto the stopper edge with the slider in the closing direction; and fixing the first casing to the slider.

12. The method of manufacturing the electronic apparatus according to claim 11, wherein the sliding unit biases the slider in the closing direction.

13. The method of manufacturing the electronic apparatus according to claim 11, wherein the sliding unit biases the slider in the opening direction.

14. The method of manufacturing the electronic apparatus according to claim 11, wherein the slider has an edge that faces the stopper edge; and wherein the engaging part is formed on the edge of the slider.

15. The method of manufacturing the electronic apparatus according to claim 11, wherein the slider has a contact surface that is in contact with the base frame when the slider is coupled to the base frame;

wherein the second casing has an opposing surface that is opposed to the first casing when the retaining hook engages with the stopper edge; and wherein the contact surface is projected from the opposing surface toward the first casing.

16. The method of manufacturing the electronic apparatus according to claim 11, wherein the engaging part is formed as a step portion between the contact surface and the opposing surface.

17. An electronic apparatus comprising:

a first casing including a retaining hook;

a second casing including a stopper edge; and a sliding unit including a base frame and a slider, the base frame being coupled to the second casing, and the slider being adapted to be coupled to the first casing;

wherein the slider is slidable between a first position and second position, the first position being defined near to a first edge of the base frame, and the second position being defined near to a second edge of the base frame that opposes the first edge;

wherein the first casing is configured to be covered by the second casing at a closed position when the slider is set in the first position;

wherein the retaining hook engages with the stopper edge when the second casing is moved to the closed position; and wherein the slider has an engaging part which is positioned outward from the second casing, and which is adapted to engage with the retaining hook of the first casing when the first casing is not yet coupled to the slider and the second casing is separated from the first casing, such that the retaining hook is adapted to move the slider in an opening direction and then be inserted between the slider and the stopper edge of the second casing so as to enable the first casing to be coupled to the slider.

* * * * *